(12) United States Patent
Aristarkhov

(10) Patent No.: US 8,379,023 B2
(45) Date of Patent: Feb. 19, 2013

(54) CALCULATING GRAPHICAL VERTICES

(75) Inventor: Andrey Y. Aristarkhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 12/337,958

(22) Filed: Dec. 18, 2008

(65) Prior Publication Data

US 2010/0156905 A1 Jun. 24, 2010

(51) Int. Cl.
*G06T 15/00* (2011.01)
(52) U.S. Cl. ............. 345/426; 345/419; 345/428
(58) Field of Classification Search ............ 345/419, 345/426, 428

See application file for complete search history.

(56) References Cited

U.S. PATENT DOCUMENTS

| | | | |
|---|---|---|---|
| 4,995,011 A * | 2/1991 | Spiesberger | 367/127 |
| 6,047,206 A * | 4/2000 | Albrecht et al. | 600/509 |
| 2005/0041024 A1* | 2/2005 | Green et al. | 345/426 |
| 2009/0027390 A1* | 1/2009 | Bin Zafar et al. | 345/426 |

* cited by examiner

*Primary Examiner* — Phu K Nguyen
(74) *Attorney, Agent, or Firm* — Trop, Pruner & Hu, P.C.

(57) ABSTRACT

A lighting equation for showing the lighting effects on a graphics logic may be solved more efficiently by grouping a plurality of vertices that represent the object to form groups of vertices. Spherical harmonic coefficients can be only calculated for the center of the group. The other coefficients within the group may be determined by interpolating the spherical harmonic coefficients across the group.

12 Claims, 1 Drawing Sheet

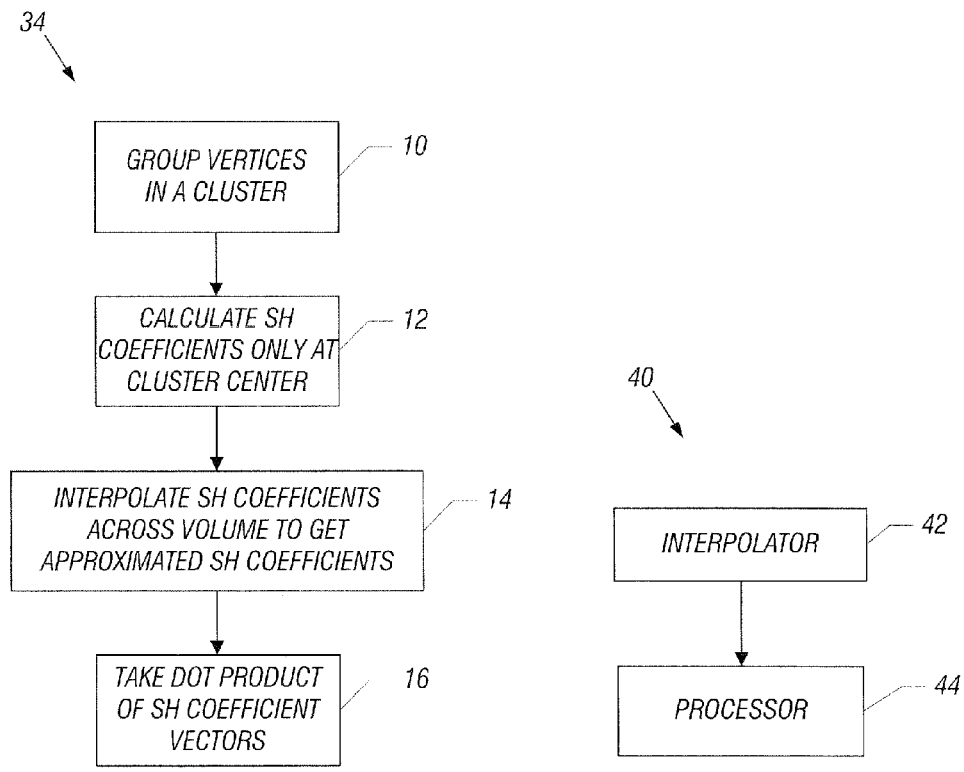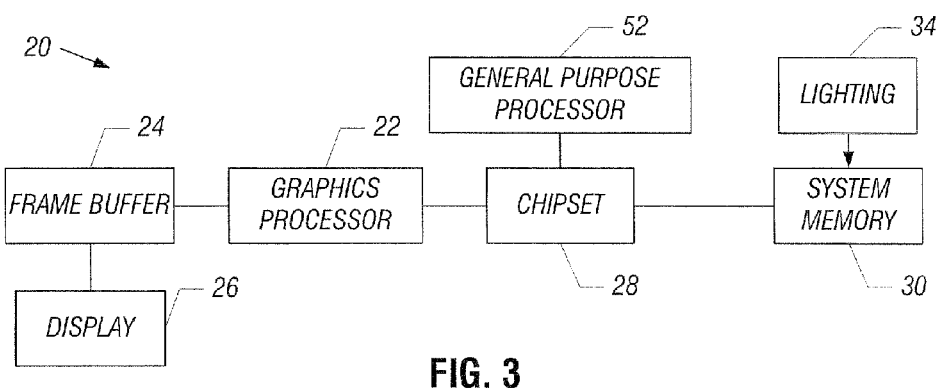

CALCULATING GRAPHICAL VERTICES

BACKGROUND

This relates generally to graphics processing and to the representation of images on graphics displays.

In rendering images for display on a computer display, the effect of light on the object may be considered. The effect of light on the object may be a function of a number of different things, including the intensity of the light, its position, and whether the lighting is direct lighting or reflected lighting.

The so-called illumination geometry of the object affects how it will be perceived as a result of the light incident upon the object. In addition, the view point of the display or the so-called viewing geometry is also important in determining how the object would look given various illumination sources.

These and other lighting effects may be determined by a lighting equation in a graphics pipeline of a processor-based system. Generally, the calculations involved in solving the lighting equation are extremely complex. As a result, computing resources may be consumed in solving the lighting equation and, in some cases, the time needed to accomplish the calculations may slow down the display.

BRIEF DESCRIPTION OF THE DRAWINGS

FIG. 1 is a flow chart for one embodiment of the present invention;
FIG. 2 is an apparatus according to one embodiment; and
FIG. 3 is a system depiction for another embodiment.

DETAILED DESCRIPTION

Solving the lighting equation may be accelerated by grouping a plurality of vertices of polygons that represent the graphical image, determining the lighting equation for a representative sample of the group of vertices and then interpolating to get a more accurate determination of the lighting equation solution for each of the grouped vertices.

In some embodiments, the calculation may be expedited, reducing the burden on the processing equipment and resulting in a faster solution.

The generalized lighting equation involves integrating an incoming radiance product and the bidirectional reflectance distribution function (BRDF) over a sphere. The BRDF gives the reflectance of a target as a function of illumination geometry and viewing geometry. The spherical harmonics lighting technique uses projections of these two functions into a spherical harmonics basis. The spherical harmonics basis is a set of orthogonal functions defined on a sphere. Decomposing a function into the spherical harmonics basis involves taking only the first several coefficients in a kind of lossy data compression. These coefficients physically correspond to the amount of the light coming from fixed directions.

The integration process then becomes a dot product of the two spherical harmonic coefficient vectors. However, generating the transfer functions for each vertex for the polygons representing the depicted objects and projecting them into the spherical harmonics basis may typically be a time consuming process.

In one embodiment, a number of vertices of polygons that represent the depicted object being processed may be grouped into a cluster structure based on location-proximate vertices may be clustered. Instead of calculating the spherical harmonic coefficients in each vector, the exact spherical harmonic coefficients are only calculated for the vertex at the center of each cluster. Then these exact values may be interpolated across the whole volume of the grouped cluster to get approximated spherical harmonics coefficients for all the remaining vertices within the cluster.

Thus, referring to FIG. 1, a sequence 34 may be implemented in firmware, software, or hardware. Software embodiments may be stored on a computer-readable medium such as an optical disk, a magnetic disk, or a semiconductor memory. Initially the vertices are grouped into a plurality of clusters, as indicated in block 10. The spherical harmonic coefficients are calculated only for the vertex at each cluster center, as indicated in block 12. Then the spherical harmonic coefficients are interpolated across the body of the cluster to get the approximated spherical harmonic coefficients for each vertex in that cluster, as indicated in block 14. Finally, the dot product of the spherical harmonic coefficient vectors is taken within a three dimensional rendering pipeline, each time the depicted object is being drawn, as indicated in block 16.

The interpolation to obtain the spherical harmonic coefficients for the actual vertices may be done using any form of interpolation, but, generally, may involve multivariate interpolation or spatial interpolation, which amounts to interpolation on functions of more than one variable. Examples of non-uniform grid multivariate interpolation techniques that may be utilized include nearest-neighbor, natural neighbor, inverse distance waiting, and Kriging. Neural networks can also be used in some embodiments.

Kriging is a group of techniques to interpolate the value of a random field at an unobserved location from observations of its value at nearby locations. With Kriging, a function may be written as a decomposition in certain basis. As one example, the basis may be a Gaussian distribution. However, other non-Gaussian distributions may be utilized as well.

Referring to FIG. 2, in accordance with one embodiment, an apparatus 40, such as a graphics chip set, a graphics engine, or a graphics processor, may include an interpolator 42 coupled to a processor 44. In one embodiment, the processor 44 calculates the spherical harmonic coefficient of a representative vertex of a group of vertexes such as vertices grouped in a cluster. Then the interpolator 42 interpolates the spherical harmonic coefficients across the cluster to get the approximated spherical coefficients for the other vertices in the cluster.

Let $f(\vec{x}_i)$ be known spherical harmonic (SH) coefficient values at cluster center positions, represented by a column vector in three dimensional space $\vec{x}_i$. The parameter $f$ is a hypothetical true SH coefficient value at some point. The parameter $f^*$ is an estimation of that unknown value $f$. The estimated value $f^*$ at any point $\vec{x}$ may be written as:

$$f^*(\vec{x}) = \sum_i C_i F_i(\vec{x}).$$

The functions $$F_i(\vec{x}) = \exp\left(-\frac{(\vec{x} - \vec{x}_i)^2}{r_i^2}\right)$$

are basis functions, which are Gaussian distribution curves around $\vec{x}_i$. The value $r_i$ is a cluster radius. Coefficients of decomposition $C_i$ may be found as a solution of the linear system, supposing that evaluated function values at given points equal to exactly known values:

$$C_i = \sum_j A_{ij}^+ f(\vec{x}_j),$$

$$A_{ij} = F_i(\vec{x}_j).$$

In Kriging, the value of an unknown real valued function f, at a point, x*, given the values of the function at some other points, $X_1, \ldots, X_n$, may be accomplished using a Kriging estimator that is linear because the predicted value $f^*(x^*)$ is a linear value, as indicated above.

The pseudoinverse matrix $A_{ij}^+$ may be used to compute a best fit or least square solution to a system of linear equations such as the Kriging equations. The pseudoinverse is a generalization of an inverse matrix. The pseudoinverse is defined and unique for all matrices whose entries are real or complex numbers. The pseudoinverse can be computed using singular value decomposition.

Let A be a square N×N matrix of real numbers. Then the following factorization of the form exists:

$$A = U \cdot \Sigma \cdot V^*,$$

where U is the square N×N unitary matrix, the matrix Σ is the square N×N diagonal matrix, and V* denotes the conjugate transpose of V. The pseudo inverse of the matrix A is computed in the following way $$A^+ = U \cdot \Sigma^+ \cdot V^*,$$

where $\Sigma^+$ is Σ with every nonzero entry replaced by its reciprocal.

In some embodiments, because the spherical harmonic coefficient computation can be performed independently for different points, a conventional algorithm scales well with the use of multiple central processing unit cores.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Referring to FIG. 3, a processor-based system 20 may include a general-purpose processor 52 coupled to a graphic chip set 28 in one embodiment. The graphic chip set may be coupled to a system memory 30 and a graphics processor 22. In one embodiment, the graphics processor 22 may be a multi-core processor. The graphics processor 22 is coupled to a frame buffer 24, in turn coupled to a display 26. In one embodiment, the lighting sequence 34 shown in FIG. 1 may be implemented as software stored in a computer-readable medium, such as the system memory 30. However, embodiments of the present invention may be also implemented in hardware or firmware.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   grouping, using a graphics processor, a plurality of vertices to form groups of vertices;
   calculating spherical harmonic coefficients of a vertex of a group;
   interpolating, using Kriging, the spherical harmonic coefficients across the group to get approximated spherical harmonic coefficients for the other vertices in the group; and
   using a pseudoinverse matrix in order to get a least squares solution to a Kriging equation.

2. The method of claim 1 including taking the dot product of the spherical harmonic coefficient vectors.

3. The method of claim 1 including using a Gaussian distribution as the basis for Kriging.

4. The method of claim 1 including solving a lighting equation using a multi-core processor.

5. The method of claim 1 wherein calculating includes calculating a coefficient for a vertex at the center of the group.

6. A non-transitory computer readable medium storing instructions that, if executed, enable a processor-based system to:
   group a plurality of vertices to form groups of vertices;
   calculate spherical harmonic coefficients only at the center of the group; and
   interpolate, using Kriging, the spherical harmonic coefficients across the group to get approximated spherical harmonic coefficients for the other vertices in the group and
   use a pseudoinverse matrix in order to get a least squares solution to a Kriging equation.

7. The medium of claim 6 further storing instructions to take the dot product of the spherical harmonic coefficient vectors.

8. An apparatus comprising:
   a processor to calculate a spherical harmonic coefficient of a representative vertex of a group of vertices; and
   an interpolator, coupled to said processor, to interpolate, using Kriging, spherical harmonic coefficients across coefficients of said group to get approximated spherical harmonic coefficients based on the calculated value for the representative vertex and to use a pseudoinverse matrix in order to get a least square solution to a Kriging equation.

9. The apparatus of claim 8, said processor to calculate a spherical harmonic coefficient of a vertex at the center of a cluster of vertices.

10. The apparatus of claim 8 wherein said interpolator is a non-uniform grid multivariate interpolator.

11. The apparatus of claim 8, wherein said Kriging interpolator uses a Gaussian distribution.

12. The apparatus of claim 8 including a multi-core processor.

* * * * *